United States Patent [19]
Colvin

[11] Patent Number: 5,916,295
[45] Date of Patent: Jun. 29, 1999

[54] METHOD AND SYSTEM FOR CALCULATING ENGINE SPEED AND ACCELERATION

[75] Inventor: Daniel Scott Colvin, Farmington Hills, Mich.

[73] Assignee: Ford Global Technologies, Inc., Dearborn, Mich.

[21] Appl. No.: 08/841,873

[22] Filed: May 5, 1997

[51] Int. Cl.$^6$ .................................................. G01M 15/00
[52] U.S. Cl. .......................... 701/110; 73/116; 73/117.3; 123/419; 123/436
[58] Field of Search .................... 73/116, 117.2, 73/117.3; 123/419, 436; 701/101, 110, 111

[56] References Cited

U.S. PATENT DOCUMENTS

| | | | |
|---|---|---|---|
| 3,757,167 | 9/1973 | Yoshikawa et al. | 317/5 |
| 3,859,512 | 1/1975 | Ritzinger | 235/151.3 |
| 4,125,295 | 11/1978 | Ruhnau et al. | 303/95 |
| 4,448,171 | 5/1984 | Ninomiya et al. | 123/419 |
| 4,527,248 | 7/1985 | Takase et al. | 701/102 |
| 4,635,201 | 1/1987 | Izumi | 701/110 |
| 4,683,545 | 7/1987 | Fauvet et al. | 364/565 |
| 5,056,360 | 10/1991 | Dosdall et al. | 73/116 |
| 5,222,022 | 6/1993 | Adams et al. | 701/110 |

*Primary Examiner*—George Dombroske
*Attorney, Agent, or Firm*—Jerome R. Drouillard

[57] ABSTRACT

A method and system for calculating engine speed of a reciprocating internal combustion engine is based upon both the number of engine cylinder events which are either completed or initiated during a predetermined time period, as well as upon the actual time required to complete the recorded number of events. Engine acceleration is determined with reference to the difference in engine speed between successive periods of operation and upon an average of the measured times of successive periods of engine operation.

1 Claim, 2 Drawing Sheets

METHOD AND SYSTEM FOR CALCULATING ENGINE SPEED AND ACCELERATION

FIELD OF THE INVENTION

The present invention relates to a method and system for calculating the speed and acceleration of a reciprocating internal combustion engine.

BACKGROUND OF THE INVENTION

Known systems for determining the speed of internal combustion engines typically utilize a clock for determining the amount of time required for cylinder events to occur. As used herein, the term "cylinder event" means, for example, two successive top dead center (TDC) pulses from a crankshaft or camshaft position sensor or other type of engine position sensor. Of course, other convenient crankshaft locations may be used as a reference point. With prior art systems, inaccuracies are encountered at high engine speed because there is a reduction in the resolution of the speed measurement arising from the fact that fewer clock timer counts are accumulated in the common event that the time for only a single cylinder event is used to calculate engine speed. U.S. Pat. No. 4,527,248, illustrates a system having a fixed sampling time interval resulting in a deficiency in accuracy at lower engine speeds.

A system and method according to the present invention overcomes the problems of the prior art by using a predetermined minimum time base for calculating engine speed and engine acceleration. This predetermined minimum base assures that an accurate reckoning of engine cylinder events may be made, so as to provide accurate engine speed and acceleration data.

SUMMARY OF THE INVENTION

A method for calculating engine speed of a reciprocating internal combustion engine includes the steps of recording both the number of engine cylinder events which are either completed in their entirety or initiated during a predetermined time period, as well as the time required to complete the recorded number of events, followed by a calculation of engine speed according to the number of cylinder events recorded and the recorded time required to complete the recorded events. In general, the predetermined time period is sufficient to complete at least one cylinder event during operation at normal engine speeds.

According to another aspect of the present invention, time may be recorded for a number of cylinder events equal to at least the number of cylinders of the engine in the event the engine is being operated so as to reduce torque output. For example, the number of cylinder events may be equal to twice the number of cylinders of the engine, or more.

According to another aspect of the present invention, a method for calculating the rotational acceleration of a reciprocating internal combustion engine includes the steps of recording the number of engine cylinder events which are either completed or initiated during a plurality of successive predetermined minimum time periods. The time required to complete the recorded numbers of events is also recorded. Thereafter, the engine's speed is calculated using the actual recorded time for the cylinder events. This calculation is concluded by calculation of the engine acceleration as a function as both the change of engine speed from at least one of the recorded time periods to at least one another one other of the recorded time periods. The calculation of the engine's acceleration is also based upon the average length of the recorded time periods.

A system for calculating engine speed of a reciprocating internal combustion engine according to the present invention includes a sensor for providing an event signal whenever any cylinder of the engine has completed an event, and a first register for holding the number of event signals occurring during a predetermined minimum time period. A second register holds the time required to complete the recorded number of events, and a processor calculates the engine's speed according to the number of cylinder events recorded and the time required to complete the recorded events.

DETAILED DESCRIPTION AND PREFERRED EMBODIMENTS

Figure 1:
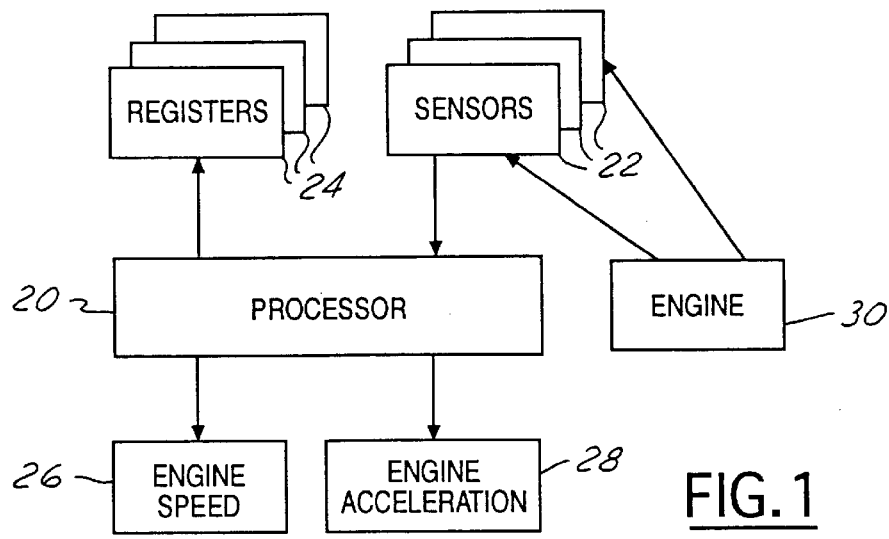
FIG. 1 is a block diagram of a system according to the present invention for determining engine speed and engine acceleration.

As shown in FIG. 1, a system according to the present invention uses processor 20, which may be drawn from the class of engine control processors known to those skilled in the art and suggested by this disclosure. Processor 20 receives inputs from a variety of sensors mounted to receive data from engine 30, such as crankshaft position and camshaft position sensors as well as other types of engine control sensors known to those skilled in the art and suggested by this disclosure.

Processor 20 also is connected with a plurality of registers 24 for gathering engine cylinder event data according to the present invention. Processor 20 outputs engine speed signals shown at 26, and engine acceleration values shown at 28.

Figure 2:
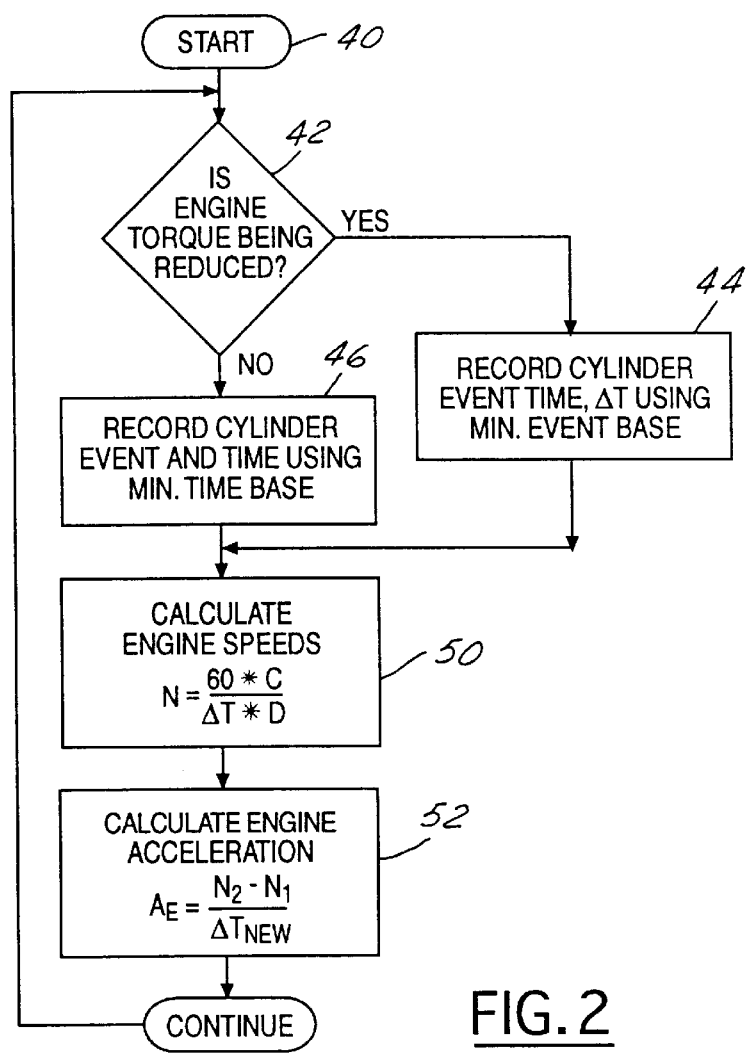
FIG. 2 is a flow chart of a method for determining engine speed and acceleration according to the present invention.

Turning to FIG. 2, processor 20 calculates engine speed and engine acceleration as follows: beginning at block 40, processor 20 starts the routine with a query whether engine torque is being reduced. Those skilled in the art will appreciate that it may be desirable to reduce engine torque for a variety of reasons such as excessive throttle application, the presence of split and low coefficient of friction surfaces, the initiation of braking action, with or without ABS, or other reasons known to those skilled in the art.

In the event at block 42 that engine torque is being reduced, the routine proceeds with block 44, which will be discussed later. In the event that engine torque is not being reduced at block 42, processor 20 will record and place into one of registers 24 the number of cylinder events during a minimum time. More precisely, one of registers 24 will record the number of cylinder events which are either completed in their entirety or initiated and then completed outside the minimum time.

Because a system and method according to the present invention determines the number of cylinder events for 20 milliseconds in an average engine system, without attempting to record only the time required for a single event, the accuracy of determining engine speed and acceleration is improved. The number of cylinder events will be recorded within one of registers 24, and the time taken by the engine to complete the recorded number of cylinder cycles will also be held in one of registers 24.

Figure 3:
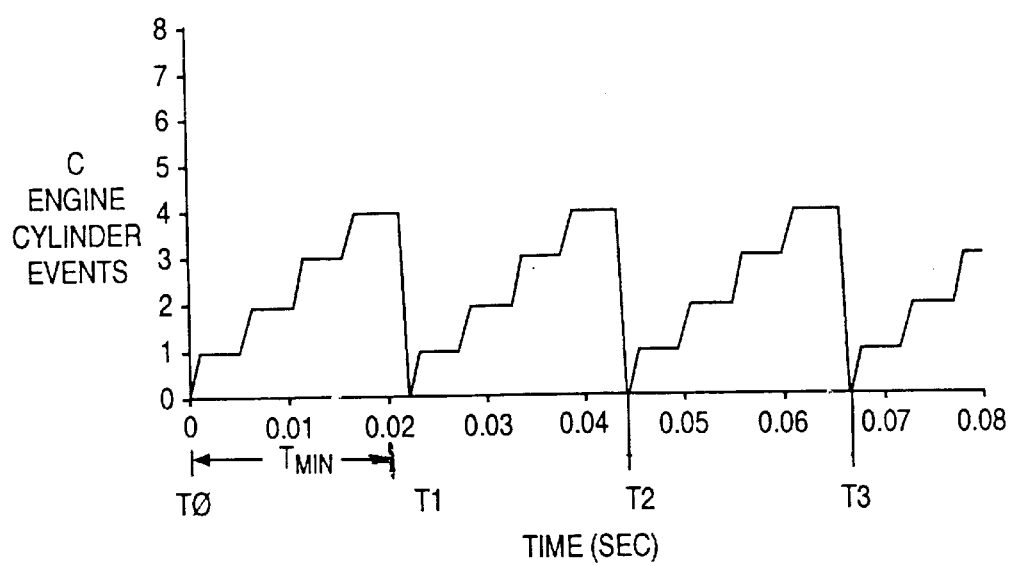
FIG. 3 is a plot of time and engine cylinder events.

At block 48, processor 20 calculates engine speed as follows; $N = 60 * C / \Delta T * D$. In this calculation, C represents the number of cylinder events recorded in one of registers 24, with such event being either completed or initiated during a predetermined time period. In this sense, completed means that the entire event was begun and completed during a predetermined time period. The predetermined time period thus marks a certain number of events, with the precise time or exact time of all the events trailing out beyond the predetermined time period being recorded in another of registers 24. In other words, if the predetermined time period is selected to be 20 milliseconds, and the engine is operating at a speed wherein one or more cylinder events initiated or begun during the 20 millisecond period continues to completion at 24 milliseconds past the beginning of the predetermined time period, the entire time of 24 milliseconds plus the number of cylinder events C will be placed into various registers 24. In the formula shown in block 48, and also set forth above, $\Delta T$ refers to the elapsed time, in seconds, for all of the cylinder events recorded in one of registers 24. In the plot of FIG. 3, the first $\Delta T$ will be equal to $T_1$ minus $T_0$, and C will be equal to 4, which is the precise number of cylinder events occurring between $T_0$ and $T_1$. Note that $T_0$-$T_3$ need not be and are not fixed times. And, $T_{min}$ indicates a minimum predetermined time period. Finally, the quantity 60 is merely a constant, and the variable D is a constant equal to the number of cylinder events per revolution of the crankshaft of any particular reciprocating internal combustion engine. It should be noted that while calculating $N_1$, processor 20 does not use the actual value of $T_{min}$ for the calculation; only the number of cylinder events occurring during the time $T_{min}$ is relevant.

After calculating successive engine speeds by running the equation in block 48 twice, so as to give the values for $N_2$ and $N_1$ which are engine speeds during successive predetermined time periods, processor 20 moves to block 50 wherein engine acceleration is calculated according to the formula $A_E = N_2 - N_1/\Delta T_{NEW}$. In this case, $A_E$ is the engine acceleration and $N_2$ and $N_1$ are, as explained above, calculated engine speeds during successive predetermined periods of time. $\Delta T_{NEW}$ is the average of the actual elapsed times recorded for the calculations of $N_2$ and $N_1$. In other words, $\Delta T_{new} = ((T_1 - T_0) + (T_2 - T_1))/2$. Having calculated engine speed and engine acceleration, the routine continues at block 52 with outputs at 26 and 28 for engine speed and engine acceleration respectively at FIG. 1.

In the event at block 42 that engine torque is being reduced, processor 20 moves to block 44 wherein cylinder event time $\Delta T$ is recorded using a minimum event base. This means that a number of cylinder events equal to the number of cylinders in the engine or perhaps the twice the number of cylinders in the engine, will form the basis for recording the actual time of the cylinder events. This is important in the event that the engine torque output is being decreased either by reducing the spark advance or by limiting the fuel delivery to one or more cylinders of the engine or by other means. It is crucial when the engine output torque is being decreased to select a greater number of cylinder events for determining the change in engine speed and engine acceleration because the engine speed and acceleration are changing quite rapidly and this makes accurate calculation more difficult. However, having past through block 44, the balance of the calculation scheme shown in FIG. 2, beginning with block 48, is conducted as before, with results of engine speed and engine acceleration then being available for further use.

While the invention has been shown and described in its preferred embodiments, it will be clear to those skilled in the arts to which it pertains that many changes and modifications may be made thereto without departing from the scope of the invention.

I claim:

1. A system for calculating engine speed of a reciprocating internal combustion engine, comprising:

a sensor for providing an event signal whenever the cylinders of the engine complete an event;

a first register for holding the number of events occurring during a predetermined minimum time period and a second register for holding the time required to complete the recorded number of events; and a processor for calculating the engine's speed according to the number of cylinder events recorded and the time required to complete the recorded events, with the time to complete at least one cylinder event being recorded when the engine is operating at constant torque, and with the time being recorded for a number of cylinder events equal to or greater than the number of cylinders in the engine only when the engine is being operated so as to reduce torque output.

* * * * *